United States Patent [19]

Tobagi et al.

[11] Patent Number: 5,446,735
[45] Date of Patent: Aug. 29, 1995

[54] BANDWIDTH ALLOCATION IN A SHARED TRANSMISSION CHANNEL EMPLOYING CSMA/CD

[75] Inventors: Fouad A. Tobagi, Los Altos; Joseph M. Gang, Jr., Saratoga; Bruce L. Lieberman, San Jose, all of Calif.

[73] Assignee: Starlight Networks, Mountain View, Calif.

[21] Appl. No.: 992,897

[22] Filed: Dec. 18, 1992

[51] Int. Cl.[6] .............................................. H04J 3/14
[52] U.S. Cl. ................................ 370/85.3; 370/85.7; 370/85.6
[58] Field of Search ................... 370/85.3, 85.2, 85.1, 370/85.6, 85.7, 93, 94.1, 94.2

[56] References Cited

U.S. PATENT DOCUMENTS

| | | | |
|---|---|---|---|
| 4,380,088 | 4/1983 | Lipcon | 370/85.3 |
| 4,594,706 | 6/1986 | Kobayashi | 370/85.3 |
| 4,766,591 | 8/1988 | Huang | 370/85.6 |

OTHER PUBLICATIONS

John D. Spragins, "Telecommunications Protocols and Design" Sect 5.25 Feb. 1991, pp. 227, 229, 230.

Primary Examiner—Douglas W. Olms
Assistant Examiner—Huy D. Vu
Attorney, Agent, or Firm—Meltzer, Lippe, Goldstein et al.

[57] ABSTRACT

In a local area network segment, the bandwidth in the channel between a network interface device, e.g., a port, switching hub, router, bridge or server, and one or more associated station is shared as follows. At the network interface device, a variable is maintained which stores information relating to the success or failure of transmission of packets in the channel. If the channel is sensed idle, the network interface device transmits the packet with probability 1. If the channel is sensed busy, the network interface device senses the channel for an end-of-carrier signal and, thereafter, waits a period of time equal to the interframe gap g. In addition, after an additional delay period $\zeta$, the network interface device reattempts to transmit the packet in the channel. If the variable maintained by the network interface device is less than a certain limit, the delay $\zeta$ is selected according to a first basic bandwidth allocation protocol. If the variable is greater than or equal to the limit, the delay is selected according to a second basic bandwidth allocation protocol.

27 Claims, 5 Drawing Sheets

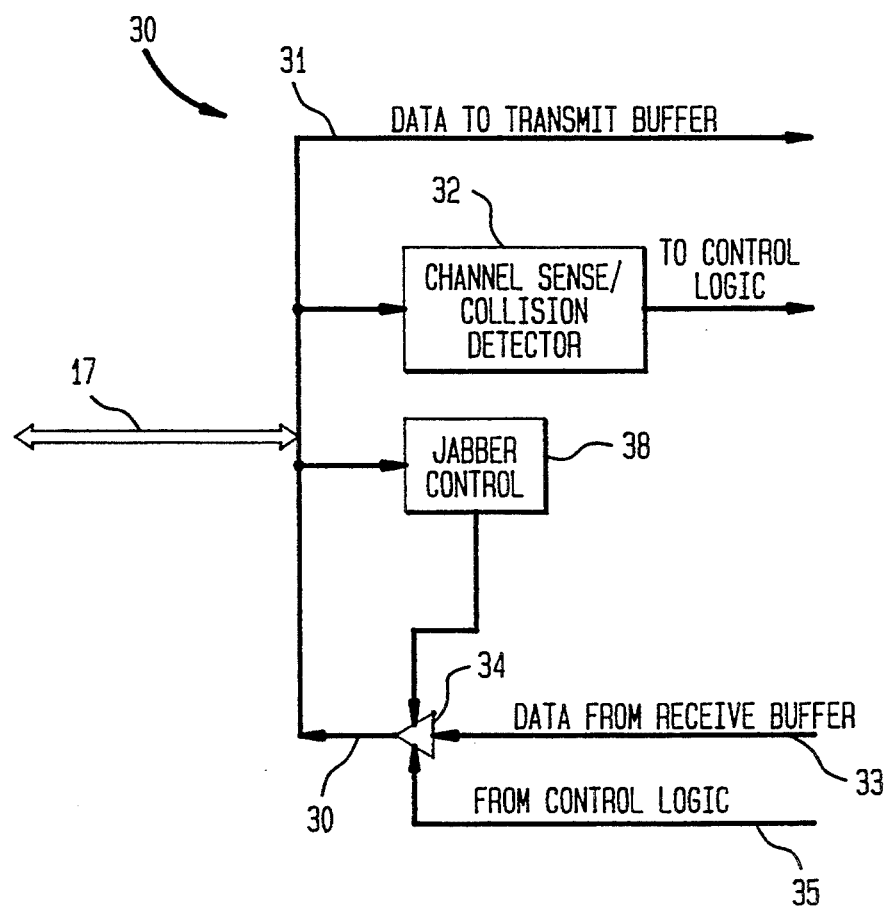

BANDWIDTH ALLOCATION IN A SHARED TRANSMISSION CHANNEL EMPLOYING CSMA/CD

FIELD OF THE INVENTION

The present invention relates to a method for allocating bandwidth in a shared transmission channel between a network interface device (e.g., a port in a switching hub, a bridge, or a router) and one or more stations employing a technique known as Carrier Sense Multiple Access with Collision Detection (CSMA/CD). The inventive method may be used to allocate the bandwidth in priority to the network interface device; to allocate the bandwidth in priority to the station(s); or to divide the bandwidth between the network interface device and the station(s) according to a prespecified ratio. With this method, the network interface device is guaranteed a particular fraction of the bandwidth. This permits the network interface device to transmit streamed data such as video to the stations in a timely fashion.

BACKGROUND OF THE INVENTION

The demand for networked digital audiovisual systems is expected to grow over the next few years, as business, government and other institutions increasingly turn to digital networks to distribute audiovisual information for education, presentations and reference applications. These customers expect systems that will allow a number of people to be able to view audiovisual information from a server simultaneously, while fully retaining their other network functions. For example, in business computing, most of the major productivity software developers see networked video as an effective means of training and supporting users. Many of these developers have begun including VHS videotapes for training with their software. Now they want to take this a step further by linking the video directly to their software's on-line help resources. Centralizing that support in a video server reduces the cost for customers with many users and ensures that it is properly maintained by the responsible persons.

Networked video presentation systems in business can allow corporate resources, such as sales videos, employee information, and video-based training to be available immediately to all employees from their desks. Similarly, networked video documentation systems will allow institutions of all kinds to maintain multi-user audiovisual databases. One large population of users of such systems are likely to be health care institutions which have extensive audiovisual records. In addition, such databases can be used for on-the-job reference such as revisiting a complex procedure on the manufacturing floor, or creating on-line archive of TV commercials for an advertising agency.

Audiovisual communication including video conferencing, video mail, and collaborative work, is yet another fast growing business application which requires the support of networked video over Local Area Networks.

The characteristics of video traffic differ substantially from those of traditional transactional data traffic to the point that Local Area Networks designed primarily to support data applications are not appropriate to effectively support video services. With data applications, the data rate associated with a traffic source is highly variable; i.e., it exhibits a high peak to average ratio. Accordingly, the design of Local Area Networks aimed at supporting data applications has been based on the principle of bandwidth sharing and statistical time multiplexing. In contrast, the data rate associated with the transmission of a video stream is relatively constant; the precise value depends on the particular encoding scheme used and the image quality desired, but it tends to be much higher than the average rate associated with a transactional data source. In particular, CCITT recommendation H.261 specifies video coding and decoding methods for audiovisual services at the rates of p $\times$ 64 Kbits/s, where p is in the range 1 to 30; the MPEG standard specifies a coded representation that can be used for compressing video sequences to bit rates around 1.5 Mbits/s; Intel's DVI video streams have a data rate of 1.2 Mbits/s or higher depending on the desired quality; the successor to MPEG, known as MPEGII, is being developed to provide a wider range of functionality and image quality than its predecessor at rates in the range of 4 to 9 Mbits/s.

Two important observations can be made. The first is that the volume of bits corresponding to a video segment of useful duration is large. A ten minute DVI video segment corresponds to 90 Mbytes. Ten hours correspond to over 5 Gbytes. Thus video servers for use in systems where shared video information is to be stored must be of relatively high capacity.

The second observation is that the transmission of a video stream of a certain data rate over a Local Area Network requires the provision of a channel of the same data rate on a continuous basis so as to achieve timely delivery of the data. To support the transmission of multiple independent video streams in a local area environment would require a network which can guarantee the bandwidth required for each video stream, and which has an aggregate bandwidth exceeding that required for the maximum configuration expected.

Among the various types of local area networks in existence, the Ethernet type is perhaps the most popular and most widely deployed. It is based on the IEEE 802.3 Standard which allows a number of stations to share a single channel of a given bandwidth. There are several specifications for the physical medium of such a communication channel:

Types 10BASE5 and 10BASE2 specify using coaxial cables in a bus topology with baseband signalling at a data rate of 10 Mb/s;

10BROAD36 specifies using coaxial cable in a tree topology with broadband signalling at a data rate of 10 Mb/s;

Types 1BASE5 and 10BASE-T specify using twisted pairs for connecting stations to a shared hub in a star configuration, with baseband signalling at data rates of 1 Mb/s and 10 Mb/s, respectively.

Star configurations using twisted pairs have become much more popular than bus configurations using coaxial cables. The majority of new installations today use 10BASE-T.

In the baseband case, the most basic network includes several busses having coaxial cables, or several star configurations based on 10BASE-T, or a mixture thereof, connected by repeaters. In such a network, all stations share the same bandwidth (e.g., 10 Mb/s). Packets transmitted by one station are broadcast to all other stations on the network. To offer a total transport capacity beyond the available bandwidth, and thus support higher bandwidth applications and/or interconnect a larger number of stations, many networks of the kind described above (also referred to here as network segments), are interconnected by devices called bridges and routers. Bridges and routers are store-and-forward devices which isolate one network segment from another. Typically, such devices are sufficiently intelligent to forward from one network segment to another only those packets destined to the other segment.

For most data applications which are currently supported by such networks, bandwidth has not imposed a major design constraint on the physical hardware used to implement a network. Instead, as a result of other limitations, networks serving large numbers of stations are typically implemented by interconnecting several network segments. These limitations include the maximum distance that may be covered by the physical medium of the channel and the maximum number of stations that may be connected to a given physical coaxial segment or hub.

Given that the data rates of video streams are on the order of 1 to 2 Mb/s, a 10 Mb/s network segment can simultaneously support only a few streams. Thus, only a few video-capable stations may be active sources or destinations of video streams at the same time. (Note that such a number of stations is smaller than the typical number of stations supported by today's network segments and requires existing networks to incur additional segmentation.) As depicted in FIG. 1, for applications that involve a (video) server 100, the server 100 must be directly accessible from each segment, 110, 120 or 130 and thus must be connected to each segment 110, 120 and 130. The number of segments 110, 120 or 130 to which a server 100 can be connected is limited to the number of Ethernet cards 111, 121 or 131 which fit in the server 100. In this configuration, the server 100 may also serve as a bridge for traffic flowing among the segments 110, 120 or 130. As depicted in FIG. 2, for large numbers of segments 11, 12, a star configuration based on a switching hub 20 is the most appropriate topology. Clearly, the switching hub 20 must have the necessary switching capacity to handle the aggregate traffic which flows among all segments 11 and 12. (The switching hub 20 essentially represents the fusion of all bridges which otherwise would have been used in a mesh configuration, each connecting a few segments, or more typically, a pair of segments). In such a configuration, the video server 18 is connected to the switching hub 20 by means of a link 16 with a bandwidth sufficiently high to support all video streams that the video server 18 is capable of serving. The link 16 may consist of several 10 Mb/s CSMA-CD channels used in parallel, a 100 Mb/s FFDI link or an ATM link with 155 Mb/s or 600 Mb/s, as required. In this case, the video server 18 is accessible to all of the segments 11 and 12 and their associated stations 13. The number of stations 13 that may be connected to each segment 11 or 12 is determined by the bandwidth requirement of each station 13. In the limit, it is possible to connect a single station 13 to each segment 11 or 12, guaranteeing a clear full bandwidth channel to each station 13.

Another major advantage of the switching hub configuration of FIG. 2 stems from the ability to properly handle the integration of different traffic types (video, audio and data) within the switching hub 20 and control the effect of one on another.

In the Local Area Network 10 of FIG. 2 a plurality of stations 13 communicate via a switching hub 20 based on a shared broadcast-type transmission medium 15 having a total bandwidth of W bits/s. Each station 13 is connected, for example, via a repeater 14, to a multiple station shared bus or transmission medium 15 by means of a half-duplex link 17 of rate V bits/s and a port 19. As shown in FIG. 3, each port 19 comprises a transmit FIFO buffer 21 and a receive FIFO buffer 23, of capacity $B_t$ and $B_r$ bits, respectively. The transfer of data from a particular station 13 to a destination device (such as another station 13 or the server 18) takes place in the form of packets of variable size, and follows three steps: the packet is first transmitted by the sending station to its port and is queued in the transmit buffer at that port; when it reaches the head of the queue, it is transmitted over the transmission medium 15 to the port to which the receiving destination device is connected, and is stored in its receive buffer; finally the packet is transmitted from the receiving buffer to the receiving destination device.

In the network 10 of FIG. 2, bandwidth must be allocated in the shared transmission medium 15 to various connections in a fair and efficient manner. A token passing algorithm may be used for allocating bandwidth in the shared transmission medium. A token passing algorithm which allocates resources in the shared transmission medium 15 in a manner so that high priority connections such as a video connections are guaranteed sufficient bandwidth is disclosed in U.S. patent application Ser. No. 07/903,855, filed Jun. 25, 1992, which is now U.S. Pat. No. 5,276,681, and assigned to the assignee hereof. The above-identified patent application is incorporated herein by reference.

The present invention is concerned with the allocation of bandwidth on the channel 17 which connects one or more stations to a port in the switching hub 20. Illustratively, this channel is implemented using a twisted pair physical medium as specified in 10BASE-T. The bandwidth on this channel has to be allocated between the port, which has packets to transmit to the stations, and the stations, which have packets to transmit to each other and to the port. Similarly, the present invention is concerned with the allocation of bandwidth between a bridge, router, or video server and stations on the segments to which such devices are connected. (For convenience, we shall refer to the port, bridge, router, or server as a network interface device.) This invention also applies if the medium 17 is wireless.

The stations transmit packets on the network segment using the IEEE 802.3 CSMA/CD protocol. This protocol operates as follows. Consider that, at some point in time t, a station has a packet ready for transmission. This may be a "new" packet that the station has never previously attempted to transmit, or an "old" packet that has been attempted a certain number of times (i.e., n times, where $n \leq 15$), but has not been successfully transmitted in any attempts due to collisions with other packets. Thus, the "old" packet has been rescheduled for another attempted transmission at the time t. The station operates as follows:

If the station senses the channel idle at time t, it initiates the transmission of the packet.

If the station senses the channel busy at time t, it monitors the channel until the end-of-carrier appears. Afterwards, following a period of time g called the interframe gap, it initiates the transmission of the packet with probability 1.

One of two outcomes is possible:

i) No collision is detected: The transmission of the packet is completed successfully and, at the end of the packet transmission, the station considers a new packet (if any) for transmission.

ii) A collision is detected: The transmission of the packet is immediately aborted, a jamming signal of duration $t_{jam}$ is transmitted, and disposition of the transmission of the packet is determined according to the Truncated Exponential Back-off Algorithm. According to the truncated exponential back-off algorithm, if the number of collisions incurred so far by the packet has reached 16, then the station aborts any further attempt to transmit the packet and notifies the upper layer of that event. If the number of thus far incurred collisions n is below 16, then the same packet is rescheduled for transmission following a rescheduling delay $\xi(n)$ where $\xi = ks$, k is an integer selected uniformly in the range $[0, 2^{min\{n,10\}} - 1]$ and s denotes the slot size. (The slot size must be greater than the maximum roundtrip propagation delay $\tau$ in the network, and has a default value of 51.2 microseconds, or equivalently, 512 bit times.)

Note that the CSMA-CD protocol has been devised for networks comprising a plurality of stations with two main objectives in mind: (i) to give fair access to all stations connected to the network, and (ii) to adapt to the load and to avoid a high rate of repeated collisions by increasing the period of time over which packets are rescheduled. (The number of collisions incurred by a packet is used as an indication of the load on the network.)

To understand the operation of the exponential backoff algorithm, consider the case where a packet to be transmitted from the station suffers its second consecutive collision at time $t_2$. According to the exponential backoff algorithm, this packet will be scheduled for retransmission at the time $t_2 + ks$ where k is randomly chosen from the range $[0, 2^2 - 1] = [0,1,2,3,]$. If, for example, k is chosen to be equal to 2 or 3, then several slots will be open for other stations or network interface devices to transmit one or more packets on the network. Thus, the exponential backoff algorithm automatically provides some bandwidth for other stations or network interface devices. It should be noted that for larger values of n, the size of the integer set from which k is chosen is larger (up to $2^{10} - 1$) and more time slots are available for the station to receive packets from the network interface device.

Now, the transmission of packets containing video data from the network interface device to the station(s) is considered. Such video data must be transmitted in a timely fashion which means that the network interface device must have a guaranteed fraction of the bandwidth of the channel between it and other stations. One possibility is to use the 802.3 protocol at the network interface device. While this protocol can be used at the network interface device for transactional data, it is not suitable for video data. The reason is that the network interface device is not guaranteed a fixed fraction of the bandwidth between the network interface device and the station(s). Instead, the exponential backoff algorithm introduces an element of randomness into the transmission process, i.e., once a packet experiences one or more collisions, it is rescheduled for transmission randomly according to the exponential backoff algorithm. This is not suitable for video data. Another approach is to let the network interface device transmit its packets without incurring any rescheduling delay (i.e., without use of exponential backoff). That is, immediately following an end-of-carrier signal in the channel, the network interface device waits for an interframe gap and then initiates transmission of its packet with probability one. As long as the network interface device has something to transmit, the stations incur a collision at each packet transmission attempt they undertake. Accordingly, should the network interface device remain busy for a long time, the stations will experience repeated collisions and have to give up the transmission of their packets. In short, this scheme gives priority to the network interface device, but provides no guaranteed bandwidth for the station.

It is an object of the present invention, to provide a technique for allocating bandwidth in the channel between a network interface device and stations in a local area network segment. In particular, it is an object of the invention to allocate the bandwidth so that a guaranteed amount of bandwidth is provided to the network interface device without causing the stations to time out. It is a further objective to allocate the bandwidth in the channel between the network interface device and stations so that the network interface device is able to transmit video data to the stations.

SUMMARY OF THE INVENTION

These and other objects are achieved by the present invention which provides a method for transmitting a packet via a shared transmission channel from a network interface device to stations in a communications network segment. In accordance with the present invention, a network interface device attempts to transmit packets as follows:

1) At the network interface device, a variable is maintained which stores information relating to the success or failure of transmission of packets in the channel.

2) If the channel is sensed idle, the network interface device transmits the packet with probability 1.

3) If the channel is sensed busy, the network interface device senses the channel for an end-of-carrier signal and, thereafter, waits a period of time equal to the interframe gap g. After an additional period which is denoted by $\zeta$, the network interface device reattempts to transmit the packet in the channel. The additional delay period $\zeta$ is determined as follows:

(a) If the variable maintained by the network interface device is less than a certain limit, the delay $\zeta$ is selected according to a first basic bandwidth allocation protocol.

(b) If the variable is greater than or equal to the limit, the delay is selected according to a second basic bandwidth allocation protocol.

As stated above, the network interface device waits a certain amount of time $\zeta$ after an interframe gap g before reattempting to transmit the packet. Illustratively, the network interface device selects $\zeta$ according to one of the following basic bandwidth allocation protocols.

1) Greedy Bandwidth Allocation: $\zeta = 0$

According to this protocol, the network interface device attempts to transmit its packet immediately after the interframe gap g, regardless of the number of collisions previously incurred. In contrast, the stations will reschedule their packets according to the truncated exponential backoff algorithm, if one or more collisions have previously occurred. Thus, this protocol provides absolute priority to the network interface device.

2) Courteous Bandwidth Allocation: $\zeta = \tau$ or s

Let $\tau$ be the maximum roundtrip propagation delay of the channel and let s be the slot time of the channel.

According to the Courteous protocol, the network interface device waits a time $\zeta$ equal to at least $\tau$ after the interframe gap g, before reattempting to transmit the packet. Often, however, $\tau$ is not known. If such is the case, $\zeta$ is selected equal to s. In the case where only a single station is on the channel, this protocol provides priority to the station which operates according to the IEEE 802.3 standard protocol. This is because if the channel is busy on account of a transmission by the network interface device, the station merely waits for the end-of-carrier signal and transmits its packet with probability 1. The network interface device, on the other hand, waits an additional amount of time $\zeta$ equal to at least $\tau$ after the end-of-carrier, and hence, is blocked by the station's transmission.

In the case where multiple stations are on the channel, priority is not necessarily guaranteed for the stations. This is because if more than one station is ready to transmit a packet while the channel is busy, the stations may repeatedly collide with one another. After each collision, the stations reschedule their packets for transmission at later times. In the meantime, the network interface device may reacquire the channel. To avoid this problem, it may be advisable, whenever a collision among stations is detected, to select $\zeta$ according to the Deferring protocol described below until one or two transmissions from the stations take place successfully.

3) Deferring Bandwidth Allocation:
$$\zeta = \tau + (2^{min\{n,10\}} - 1) \cdot s \text{ or } 2^{min\{n,10\}} \cdot s$$

Let $\tau$ be the maximum roundtrip propagation delay of the channel, let s be the slot time of the channel and let n be the number of collisions thus far incurred by the stations. According to this protocol, the network interface device waits a period of time $\zeta$ at least equal to $\tau + (2^{min\{n,10\}} - 1) \cdot s$, prior to reattempting to transmit a packet. As above, if $\tau$ is not known, then $\zeta$ is selected equal to $2^{min\{n,10\}} \cdot s$. Thus, the network interface device delays reattempting to transmit a packet for a period $\zeta$ greater than the maximum rescheduling delay that a station may select according to the truncated exponential backoff algorithm of the IEEE 802.3 standard protocol.

It may be appreciated that the method according to the present invention combines any two of the basic bandwidth allocation protocols. Depending on the selection of the particular information maintained at the network interface device, and which basic bandwidth allocation protocols are combined, the method of the present invention achieves one or more objectives. For instance, it may be desired to ensure that bandwidth be divided between the station and the network interface device continuously according to a predetermined ratio. Alternatively, it may be desired to limit the number of consecutive packets transmitted by the network interface device or the station. The following are exemplary combinations for achieving these ends.

1) Greedy If $n < \alpha$, Then Defer to Stations

In this method, the information maintained at the network interface device is the number of collisions n thus far incurred by the stations. The limit, which controls the protocol utilized in selecting $\zeta$, is simply a certain maximum number of collisions $\alpha$. Thus, the network interface device selects $\zeta$ according to the Greedy protocol until at least $\alpha$ collisions are incurred. Then the network interface device selects $\zeta$ according to the Deferring protocol.

2) Greedy If $n < \alpha$, Then Courteous

In this method, the network interface device maintains the number of collisions n thus far incurred by the stations and utilizes the maximum number of collisions $\alpha$ to determine which protocol to follow, as in the first method. Consider the case of single station. The network interface device selects $\zeta$ according to the Greedy bandwidth allocation protocol until the number of collisions n thus far incurred by the stations is greater than or equal to $\alpha$. Then, the network interface device switches to using the Courteous bandwidth allocation protocol until the station transmits a packet successfully. Following that, the network interface device resets n to 0 and repeats the method.

For the case of multiple stations on the same segment, the same applies. But in this case, repeated collisions may occur among multiple backlogged stations. To avoid this problem, $\zeta$ is selected according to the Deferring bandwidth allocation protocol until one or two transmissions by the stations take place successfully, whenever a collision among stations is detected.

3) Courteous If $q < \delta$, Then Greedy

In this method, the information maintained at the network interface device is the number of packets q successfully transmitted by the stations in each window of time w. The limit which controls which protocol to follow is simply the maximum number of packets $\delta$ that the station is permitted to transmit in a given window of time w. If $q < \delta$, then the network interface device selects $\zeta$ according to the Courteous bandwidth allocation protocol. Otherwise, the network interface device selects $\zeta$ according to the Greedy bandwidth allocation protocol.

4) Greedy if $m < \beta$, Then Courteous

In this method, the information maintained at the network interface device is the number of packets m successfully transmitted by the network interface device in each window of time w. The limit that controls which protocol to follow is the maximum number of packet transmissions $\beta$ guaranteed to the network interface device in a given window w of time. If $m < \beta$, then $\zeta$ is selected according to a Greedy bandwidth allocation protocol. Otherwise, $\zeta$ is selected according to the Courteous bandwidth allocation protocol.

5) Greedy If $m/q < \gamma$, Then Courteous

In this method, the information maintained at the network interface device is the ratio of the number of packets m transmitted by the network interface device to the number of packets q transmitted by the station, i.e., $m/q$, in each window of time w. The limit that controls which protocol to follow is the desired ratio $\gamma$ of the network interface device's throughput to the station's throughput. If $m/q < \gamma$, then the network interface device selects $\zeta$ according to the Greedy bandwidth allocation protocol. Otherwise the network interface device selects $\zeta$ according to the Courteous bandwidth allocation protocol.

BRIEF DESCRIPTION OF THE DRAWINGS

FIG. 5 illustrates a transceiver utilized in the network interface device of FIG. 4.

DETAILED DESCRIPTION OF THE INVENTION

Figure 1:
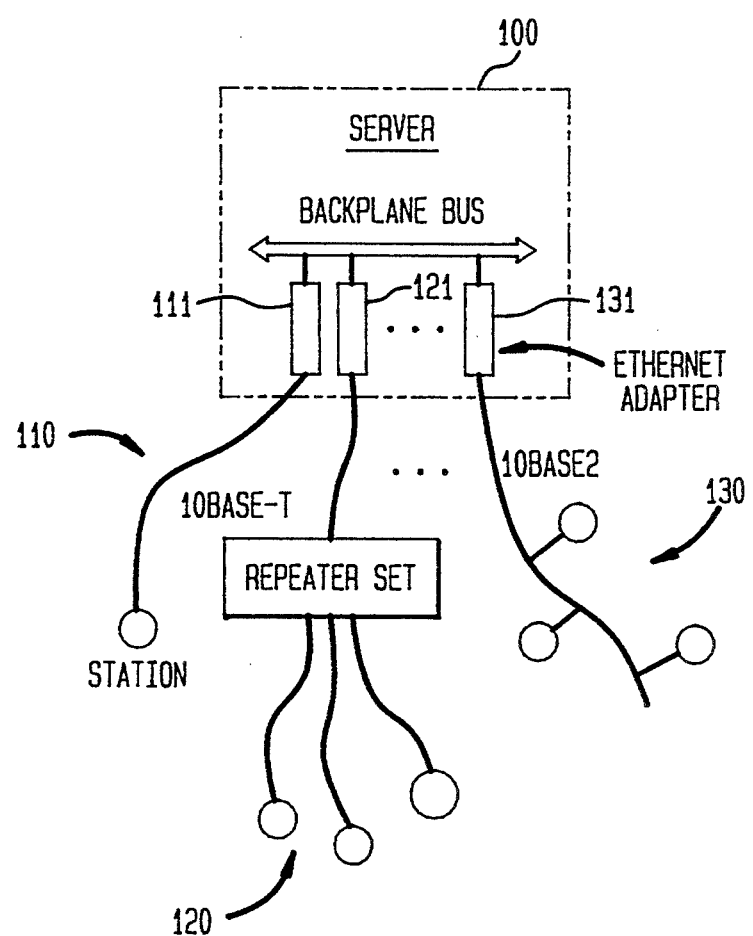
FIG. 1 schematically illustrates a Local Area Network comprising a plurality of stations interconnected by a server.
Figure 2:
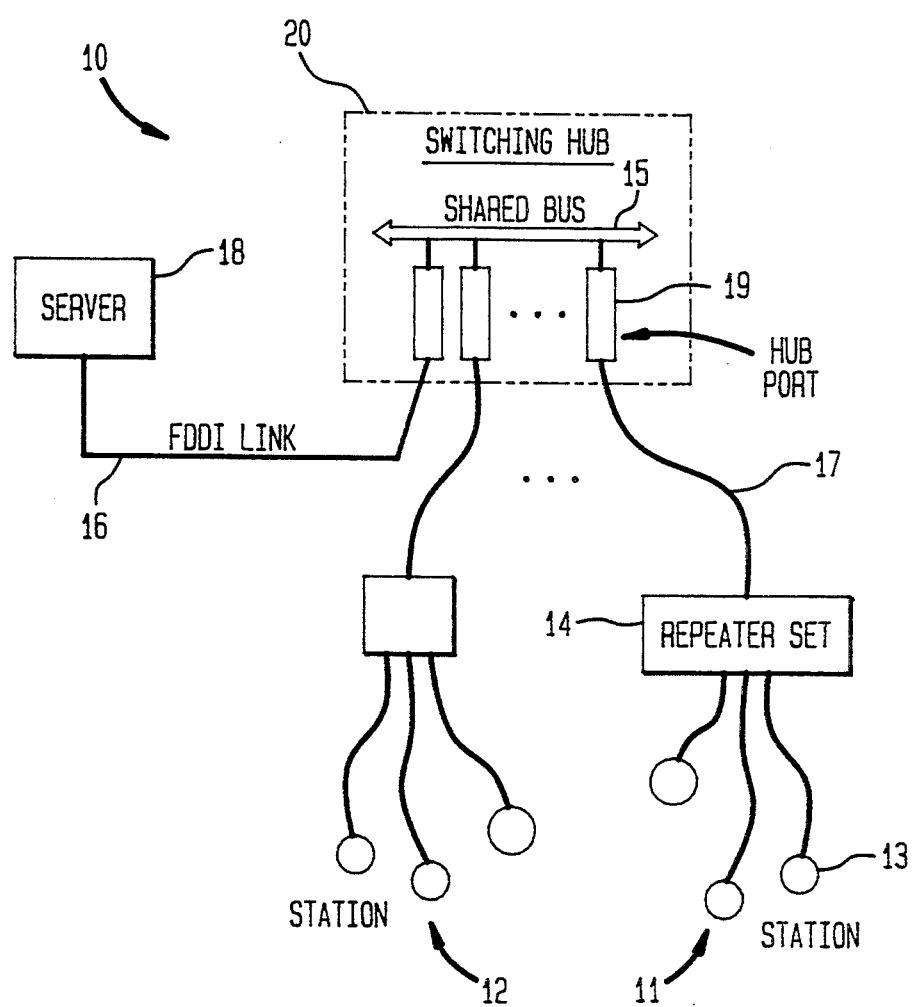
FIG. 2 schematically illustrates a Local Area Network comprising a plurality of stations interconnected by a switched hub according to the 10BASE-T specifications.
Figure 3:
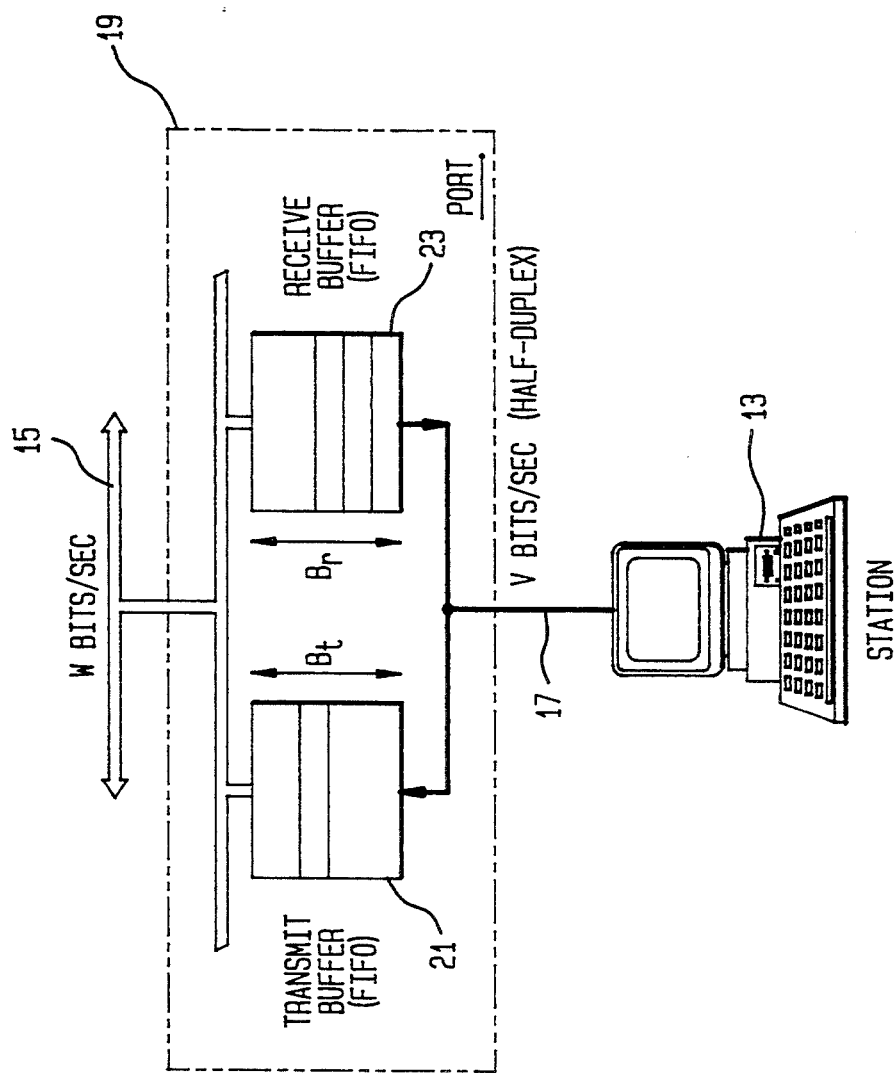
FIG. 3 schematically illustrates a network interface device used to connect each station to the shared transmission medium in FIG. 1.
Figure 4:
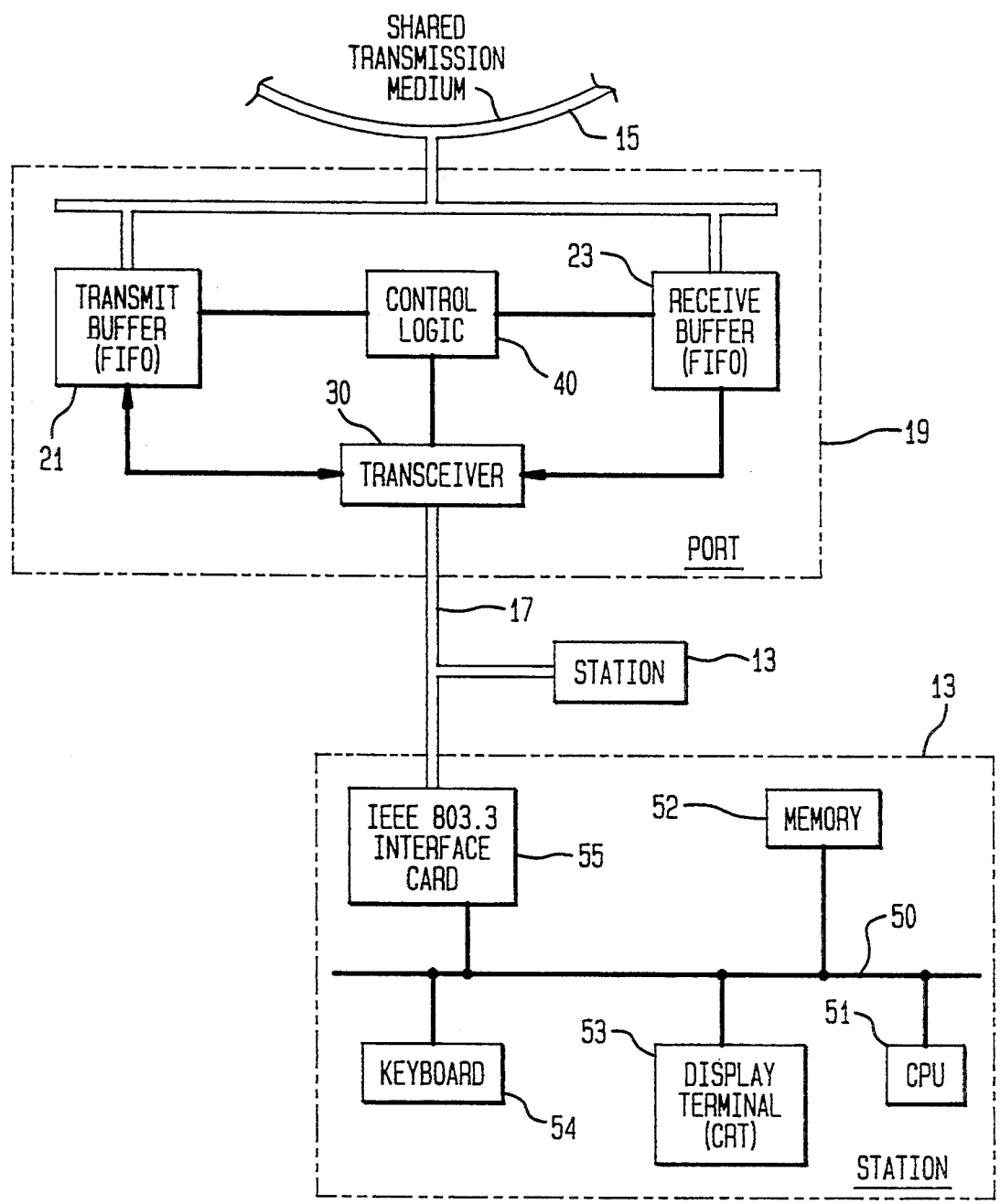
FIG. 4 illustrates a station, a network interface device and the transmission channel between them, wherein bandwidth is allocated in accordance with the present invention.

The network interface device 19 and station 13 which carry out the bandwidth allocation process of the present invention are shown in greater detail in FIG. 4. As shown in FIG. 4, the network interface device 19 and station 13 are connected by a channel 17 which is preferably formed using a twisted pair of wires.

As indicated above, the network interface device 19 comprises a transmit buffer 21 which receives packets from the station 13 via the channel 17 and transmits the packets via the shared transmission medium 15. The network interface device 19 also includes a receive buffer which receives packets via the transmission medium 15 and then transmits the packets via the channel 17 to the station 13.

The network interface device 19 also comprises a transceiver 30 and control logic 40. The transceiver 30 is shown in greater detail in FIG. 5. As shown in FIG. 5, the transceiver receives packets via the channel 17 and transmits the packets via path 31 to the transmit buffer 21 (see FIG. 4). The transceiver 30 also comprises a channel sense/collision detector circuit 32. This circuit senses the channel 17 and can determine whether the channel 17 is idle or whether there is a collision between two packets propagating in the channel 17. The output of the channel sense circuit 32 is connected to the control logic 40. The transceiver 30 also includes a path 33 by which data packets are transmitted from the receive buffer 23 into the channel 17. The path 33 includes a control switch device 34. Control signals generated by the control logic 40 are transmitted via path 35 to the control switch device 34 to determine the timing of the transmission of data packets from the receive buffer 23 into the channel 17. In the transceiver 30, there is also a jabber control 38. The jabber control 38 provides electrical isolation between the physical medium of the channel 17, e.g., a twisted pair of wires, and the electronics of the network interface device 19. Without the jabber control 38, it is possible for a faulty transceiver to continuously transmit random data via the channel 17 and corrupt all other transmissions.

Illustratively, the station 13 is a personal computer or other computer system. Illustratively, the station 13 comprises an internal bus 50. Attached to the bus 50 are a CPU 51, a memory system 52, a display device 53 such as a CRT which is capable of displaying a video image, a keyboard 54 or other I/O device, and an interface card 55. The interface card is commercially available and carries out the IEEE 802.3 protocol. More particularly, the interface card is similar in structure to the network interface device 19 in that it comprises a first buffer for holding packets to be transmitted over the channel 17, a second buffer for holding packets received via the channel 17, and a transceiver for actually transmitting and receiving packets via the channel 17 including a channel sensor circuit and jabber control. There is also control logic for controlling the timing of packets transmitted into the channel 17 by the interface card.

The present invention is directed to allocating the bandwidth in the channel 17 between the network interface device 19, which has packets to transmit to the stations 13, and the stations 13, which have packets to transmit to the network interface device 19. In particular, the bandwidth of the channel 17 may be allocated to give the network interface device priority. Alternatively, bandwidth of the channel 17 may be allocated in priority to the stations 13. In yet a third alternative scheme, bandwidth is allocated between the stations 13 and the network interface device 19 according to a particular ratio.

In accordance with a preferred embodiment of the invention, the station 13 transmits packets to the network interface device 19 using the IEEE 802.3 protocol.

The network interface device 19, however, does not use the IEEE 802.3 protocol. Instead in accordance with the invention, the network interface device 19 uses a different packet transmission method based on CSMA/CD.

In accordance with a packet transmission method of the present invention, the network interface device 19 transmits packets to the stations 13 as follows. The network interface device 19 attempts to transmit each of its packets via the channel 17 to a station 13 one or more times. During each attempt, the channel sense circuit 32 senses the channel 17 to determine if the packet experiences a collision with another transmitted packet, e.g., from a station 13 to the network interface device 19, between two stations 13, etc. (If no collision is sensed, the packet is assumed to have been successfully transmitted). The output of the channel sense circuit 32 is transmitted to the control logic 40 at the network interface device 19. The control logic 40 maintains information regarding the previous success or failure in transmitting packets. For instance, the control logic 40 may count the number of collisions n experienced by packets transmitted by the stations 13. Alternatively, or in addition, the control logic 40 may count the number m or q of packets successfully transmitted from the network interface device, or station, respectively (or both) in the current observation window of time w. Under the control of the control logic 40, if the channel 17 is busy, it is sensed by the channel sensor 32 to determine the end of a carrier signal in the channel 17.

Afterward, the network interface device 19 waits a period of time equal to the interframe gap g. Then, after a delay period $\zeta$, the network interface device 19 attempts to transmit the packet. The delay period $\zeta$ is selected according to a first basic bandwidth allocation protocol if the variable maintained by the logic circuit 40 is less than a certain limit. However, if the variable equals or exceeds the limit, $\zeta$ is selected according to a second basic bandwidth allocation protocol. The basic bandwidth allocation protocols, and combinations which may be formed according to the method of the present invention, are discussed in detail below.

The basic bandwidth allocation protocols are now discussed in detail.

1) Greedy Bandwidth Allocation Protocol

According to this protocol the delay time $\zeta$ is set equal to 0. As such, this protocol gives absolute priority to the network interface device 19. The station 13 may successfully transmit a packet (i.e., is not interfered with by the network interface device 19) only when the network interface device 19 has no packets ready for transmission. (Note: this protocol is valid whether there is a single station 13 or multiple stations 13 on the same segment.)

2) Courteous Bandwidth Allocation Protocol:

According to this protocol, $\zeta$ is set equal to at least the maximum roundtrip propagation delay $\tau$ of the channel. Often, $\tau$ is not known. In this case, $\zeta$ is set equal to the slot time s of the channel. In the case of a single communicating station 13, should the station 13 find the channel busy due to a transmission by the network interface device 19, the station 13 waits for the interframe gap g following the end-of-carrier and transmits with probability 1 (according to the IEEE 802.3 standard protocol). Because the network interface device 19 is delayed at least the time $\tau$ after the interframe gap g before reattempting to transmit its packet, the station 13 succeeds. The network interface device 19 is therefore blocked. Note that this protocol does not necessarily guarantee that there will never be any collision between the station 13 and the network interface device 19. This is because it is still likely for both to start their respective packet transmissions at the same time. However, should that occur, a maximum of one successful packet transmission by the network interface device 19 may take place prior to the station 13 succeeding.

With the slot time set to s=51.2 microseconds by the IEEE 802.3 Standard, the Courteous bandwidth allocation protocol introduces an overhead which decreases the utilization of the channel bandwidth, particularly if the packet size is small. Accordingly, this protocol functions in a similar fashion with $\zeta$ chosen to be no smaller than $\tau$, which is much smaller than the slot time s. This is in particular the case when the 10BASE-T physical specification is used, which restricts the length of the cable to be no longer than 100 m.

In addition to decreasing the overhead incurred in idle time, the choice of $\zeta = \tau$ has an additional positive effect if only a single station 13 is connected to the segment. When the station 13 chooses its rescheduling delay to be $\xi = 0$, it may successfully transmit a packet because the network interface device 19 waits for a period of time equal to $\tau$. When the station 13 chooses its rescheduling delay to be $\xi = s$, the network interface device 19 preempts the station 13, and blocks the station's transmission instead of colliding with it in a similar fashion as when $\xi > s$. However, at the next end-of-carrier, the station 13 is bound to succeed.

When multiple stations 13 are connected to the same segment, the Courteous bandwidth allocation protocol does not necessarily give the stations 13 priority as is the case with a single station 13. Instead, repeated collisions may occur among the stations 13 which are ready to transmit. To illustrate this effect, consider the scenario where two stations 13 become ready to transmit a packet while the network interface device 19 is transmitting a packet. At the end-of-carrier, the two stations 13 transmit with probability one and collide with each other (a single station 13 would have succeeded). Each station 13 reschedules its packet independently according to the truncated exponential backoff scheme. There is a probability of ½ that one of them succeeds, and a probability of ½ that they get blocked by the network interface device's 19 next transmission, wait until the end-of-carrier, and collide again. As the stations 13 incur further collisions and reschedule their transmissions according to the exponential backoff scheme, the likelihood that they reschedule their next attempted transmission during a subsequent transmission by the network interface device 19 (and result in yet another collision) increases. Invariably, the range of rescheduling delays increases beyond the network interface device's 19 packet transmission times. Thus, the likelihood that the station 13 respective rescheduling delays fall in separate packet transmissions by the network interface device 19 eventually increases. This, in turn, increases the chance of success by the stations 13. Thus, whenever multiple stations 13 become ready for transmission, the network interface device 19 clearly has an increased chance of acquiring the channel 17 over some period of time. To avoid this problem, it may be advisable to do one of the following: (i) whenever a collision among stations 13 is detected, select $\zeta$ according to the Deferring protocol until one or two transmissions from the stations 13 take place successfully; or (ii) whenever a collision among stations 13 is detected, delay the attempt by the network interface device 19 to transmit a packet for a period ks for some appropriately chosen value of k greater than one.

3) Deferring Bandwidth Allocation Protocol

According to this protocol, whenever a collision is incurred, the network interface device 19 chooses $\zeta$ equal to at least $\tau + (2^{min\{n,10\}} - 1) \cdot s$, where $\sigma$ and s are the maximum roundtrip propagation delay and the slot time, as above, and n is the number of collisions thus far incurred by the stations 13. As above, if $\tau$ is not known, then $\zeta$ is selected equal to $2^{min\{n,10\}} \cdot s$.

If there is a single station 13 on the segment, then the maximum rescheduling delay this station 13 may chose following its first collision is s, which is shorter than the delay $\zeta = \tau + s$ (or 2s) of the network interface device 19. Thus, the network interface device 19 defers to the station 13, and permits the station 13 to successfully transmit its packet. If the station 13 does not transmit a packet by the end of the first slot as it should have, the network interface device 19 reacquires the channel 17 at the end of its waiting period ($\zeta = \tau + s$ or 2s). Otherwise, the network interface device's 19 transmission is blocked by the station's 13 transmission. Stated another way, following a collision, the network interface device 19 waits until the station 13 transmits its packet successfully, or until a time-out period equal to the maximum possible rescheduling delay (namely, $\zeta = \tau + s$ or 2s) has elapsed, whichever occurs first. Clearly, this protocol gives absolute priority to the station 13.

Consider the case of multiple stations 13 on the segment. Note that in this case, collisions may occur between the network interface device 19 and the stations 13 as well as among the stations 13. While the network interface device 19 can easily distinguish between the two types of collisions, it is not in a position to know exactly how many stations 13 may be ready, nor how many collisions each packet may have already incurred. Thus, following a collision, the network interface device 19 illustratively waits until a certain number of packets $\Gamma$ are transmitted successfully by the station(s) 13, or until some appropriately determined time-out period $\tau + (2^{min\{n,10\}} - 1) \cdot s$ (or $2^{min\{n,10\}} \cdot s$) has elapsed, whichever occurs first.

Note that the above basic bandwidth allocation protocols give priority either to the network interface device 19 or to the stations 13. The above method combines two of these basic bandwidth allocation protocols in order to properly allocate the bandwidth of the channel 17 between the stations 13 and the network interface device 19. Depending on which two protocols are combined and the particular information maintained by the logic circuit 40 (and the limit thereof that controls which of the two protocols to follow) bandwidth may be allocated with different desired priorities. In many situations, it is important to divide the bandwidth between the network interface device 19 and the station 13 as continuously as possible according to some predetermined ratio. Alternatively, it may be important to limit the number of consecutive packets that the station 13 may transmit successfully, given that the network interface device 19 has packets ready for transmission. On the other hand, it may be desired to limit the number of consecutive packets that the network interface device 19 may transmit, given that the station 13 has packets ready for transmission. The following transmission methods are exemplary combinations of the aforementioned three basic bandwidth allocation protocols for selecting the delay $\zeta$ to allocate bandwidth according to one of the above additional provisions.

Two transmission methods are discussed below in which the logic circuit 40 of the network interface device 19 maintains, in a variable n, the number of collisions incurred so far by packets transmitted from the stations 13. Initially n=0, and is incremented by one with each collision incurred by a station 13 until a station 13 successfully transmits its packet. Upon successfully transmitting a packet, the logic circuit 40 of the network interface device 19 resets n to 0.

1) Greedy If $n<\alpha$, Then Defer to Stations

In a first transmission method, the network interface device 19 utilizes the Greedy protocol until a certain number $\alpha$ of collisions n is incurred by the stations. Thus, $\alpha$ corresponds to the aforementioned limit of the method according to the invention. If $n \geq \alpha$, the network interface device 19 utilizes the Deferring protocol. According to the Deferring protocol, the network interface device 19 waits until the station 13 transmits a packet successfully or until the maximum rescheduling delay $\zeta = \tau + (2^{min\{n,10\}} - 1) \cdot s$ (or $2^{min\{n,10\}} \cdot s$), given the number of collision n thus far incurred by the stations, has elapsed, whichever occurs first. Following that, the logic circuit 40 of the network interface device 19 resets n to 0 and repeats the above steps.

In the first method, as the number of collisions incurred by the station(s) 13 increases, the time wasted (in the form of channel idle time) by having the network interface device 19 defer to the station(s) 13 increases. This disadvantage may be avoided using a second transmission method.

2) Greedy If $n<\alpha$, Then Courteous

In the second transmission method, the network interface device 19 initially utilizes the Greedy protocol until a certain number $\alpha$ of collisions n is incurred by the stations. Thus, the number of collisions n and the threshold $\alpha$ are the variable maintained by the logic circuit 40, and the limit that controls which protocol to utilize in selecting $\zeta$, respectively. If $n \geq \alpha$, the network interface device 19 switches to the Courteous mode until a station 13 transmits a packet successfully or until the maximum rescheduling delay $\zeta = \tau$ (or s) has elapsed, whichever occurs first. Following that, the logic circuit 40 in the network interface device 19 resets n to 0 and repeats the method.

For the case of multiple stations on the same segment, the above applies. But in this case, repeated collisions may occur among backlogged stations at the end-of-carrier as described above in the discussion of the Courteous bandwidth allocation protocol. To avoid this problem, it may be advisable to do one of the following: (i) whenever a collision among stations 13 is detected, select $\zeta$ according to the Deferring protocol until one or two transmissions from the stations 13 take place successfully; or (ii) whenever a collision among stations 13 is detected, delay the attempt by the network interface device 19 to transmit a packet for a period ks for some appropriately chosen value of k greater than one.

It may be desired in either of the above methods to vary the limit $\alpha$ in time depending on a number of factors. For example, it may be desired to alternate between two values of $\alpha$, such as $\alpha_1$ and $\alpha_2$, to achieve a specific desired throughput result which is not possible with a single fixed value. Similarly, it may also be desired to consider the parameter $\alpha$ to vary dynamically, for example, to vary $\alpha$ depending on the frequency of occurrence of collisions, or the queue depth in the network interface device 19, etc.

Three transmission methods are discussed below in which the particular basic bandwidth allocation protocol used by the network interface device 19 depends on a function of the throughput acquired so far by either the network interface device 19, or the station(s) 13, or both. The throughput here may be defined as the fraction of time occupied by successful transmissions during an observation window of a specified duration denoted by w, or by the number of such successful transmissions. Illustratively, the throughput is measured by the control logic 40 of the network interface device 19. Two measurement techniques may be considered.

In a first window technique, at any given point in time, the observation window, during which the throughput is measured, is the most recent interval of time of duration w. In a second "jumping window" technique, the time axis is divided into non-overlapping intervals of duration w, and the throughput is measured in each window independently of all previous windows. In the jumping window technique, the measured throughput in the current window is considered.

These methods achieve rate control over the network interface device 19 and the station(s) 13 in a more straightforward manner than possible using the aforementioned methods which use a particular protocol depending on the number of collisions. By the same token, with appropriate choices of the window size and control mechanism, these methods which monitor throughput may be used to limit the period of time separating two consecutive transmissions from either the network interface device 19 or the station(s) 13, whichever is needed.

Without loss of generality, the throughput is measured in terms of the number of successful transmissions in a window w. We let m and q denote the number of successful packet transmissions that the network interface device 19 and the station 13 have acquired in the current observation window, respectively, The following are examples of transmission methods performed by the network interface device 19 to achieve certain desirable results.

3) Courteous If q<δ, Then Greedy

In a third method, the information maintained by the logic circuit 40 at the interface device 19 is the number of successful transmissions by the station(s) q. Furthermore, the limit that controls which protocol to follow is the maximum number of packet transmissions δ that the station(s) 13 is permitted to transmit in a given window of time w. According to a third transmission method, if q<δ, then the network interface device utilizes the Courteous protocol. Otherwise, the network interface device 19 utilizes the Greedy protocol. This method prevents unnecessary collisions, yet enforces a limit on q. Should the station(s) 13 have little traffic, this method is preferable, as it causes no collisions with the station(s) 13. Should the station(s) 13 have a long burst of packets, this method allows the station(s) 13 to fulfill its (their) quota for successfully transmitted packets in a window w first, and then blocks the station(s) 13 in favor of the network interface device 19.

Similarly, the third method may be modified so that if q<δ, the network interface device 19 utilizes the Deferring protocol. Otherwise, the network interface device 19 uses the Greedy protocol.

4) Greedy If m<β, Then Courteous

In a fourth transmission method, the number of packets transmitted by the network interface device 19, rather than the station(s) 13, is guaranteed. Here, the logic circuit 40 of the network interface device 19 maintains the number of packets m transmitted by the network interface device 19 in each observation window of time w. The limit that controls which protocol to follow is the maximum number of packet transmissions β that the network interface device 19 is to be guaranteed in a given observation window of time w. According to the fourth method, if m<β, then the network interface device 19 uses the Greedy protocol. Otherwise, the network interface device 19 uses the Courteous protocol.

The fourth method is somewhat similar to the third method. The difference between the two methods is that in the fourth method, the network interface device 19 fulfills its quota of successfully transmitted packets first, possibly causing collisions to occur with the station 13 unnecessarily.

As with the third method, the fourth method may be modified so that if m<β, the network interface device 19 uses the Greedy protocol. Otherwise, the network interface device 19 utilizes the Deferring protocol.

5) Greedy If m/q<γ, Then Courteous

Finally, in a fifth transmission method, a certain ratio of throughput is maintained in each observation window of time w. Here, the information maintained by the logic circuit 40 at the network interface device 19 is the ratio of the number of packets m successfully transmitted from the network interface device 19 to the number of packets q successfully transmitted from the station 13, i.e., m/q. The limit that controls which protocol to follow is the desired ratio γ of the network interface device's 19 throughput m to the station's 13 throughput q. According to the fifth method, if m/q<γ, the network interface device 19 uses the Greedy protocol. Otherwise, the network interface device 19 uses the Courteous protocol. The fifth method is especially desirable when w is large as it permits the sharing of the bandwidth according to the prescribed ratio γ in a continuous manner.

Furthermore, as with the first and second methods, the parameters δ, β, γ, w, etc. may alternate between a number of values over time or vary as a function of time depending on one or more factors.

For purposes of illustration, the performance of two of the above methods, i.e., the first and second methods, is evaluated for a network segment having a network interface device and a single station. To evaluate the performance of the first and second inventive packet transmission methods, consider the case where the traffic in the channel between the network interface device and the station is heavy (i.e., both the network interface device and station have packets queued for transmission). Assume further that all of the packets are of maximum size.

In the case of an Ethernet network (i.e., a network following the IEEE 802.3 protocol), the slot size denoted by s has a default value of 51.2 microseconds (512 bit times). The maximum packet size, $B_{max}$, is equal to the maximum frame size (specified to be 1518 bytes) plus a preamble (equal to 8 bytes) for a total of 1526 bytes (12,208 bits). The minimum packet size, $B_{min}$, is equal to the minimum frame size (specified to be 64 bytes) plus an 8-byte preamble for a total of 72 bytes. The interframe gap, denoted by g, is specified to be 9.6 μs (96 bit times). The length of a jam period denoted by $t_{jam}$ is specified to be 32 bit times.

$T_p$ and $T_s$ denote the transmission time of a packet transmitted by the network interface device and the station, respectively. As all packets are assumed to be of a maximum size, $T_p = T_j = 12,208$ bit times. Let $T_c$ denote the collision period; it is pessimistically assumed to be equal to the minimum packet size. Finally, let $\sigma_{max}$ denote the number of time slots in a packet of maximum size; $\sigma_{max} = 12,208/512 \approx 24$.

The performance of the first packet transmission method according to the invention is now analyzed.

Define a cycle to be the period of time beginning with the end of a successful transmission by the station and ending with the end of the next successful transmission by the station. The cycle comprises c unsuccessful transmissions by the network interface device separated by some number (possibly 0) of successful transmissions by the network interface device, followed by the station's last rescheduling delay and the station's successful transmission.

Without loss of generality, the cycle begins at time $t_0 = 0$. Let $t_n$ denote the time corresponding to the end of the $n^{th}$ collision. The cycle length c is given by $$C = \sum_{n=1}^{c} (t_n - t_{n-1}) + g + ks + T_s \qquad (1)$$

where k is an integer selected uniformly from the range $[0, 2^{min\{c,10\}} - 1]$.

The average cycle length is given by $$E[C] = X(c)(g + T_p) + c(g + T_c + t_{jam}) + \qquad (2)$$

$$g + \left(\frac{2^{min\{c,10\}} - 1}{2}\right)s + T_s$$

where $$a_n = \left\lceil \frac{2^{\min\{n,10\}} - 1}{\sigma_{max}} \right\rceil \quad (3)$$

and where $$X(c) = \sum_{n=1}^{c} \sum_{j=0}^{a_n-1} \frac{2^{\min\{n-1,10\}} - 1 - j \cdot \sigma_{max}}{2^{\min\{n-1,10\}}} \quad (4)$$

The fractions of the total bandwidth which are acquired by the network interface device and the station are given by $$E[\text{network interface device}] = \frac{X(c)T_p}{E[C]} \quad (5)$$

$$E[\text{station}] = \frac{T_s}{E[C]} \quad (6)$$

The remainder of the bandwidth is overhead.

TABLE 1

| c | E[inter.] | E[sta.] | overhead |
|---|-----------|---------|----------|
| 2 | 0 | 0.9255 | 0.0775 |
| 3 | 0.4844 | 0.3875 | 0.1281 |
| 4 | 0.5766 | 0.2713 | 0.1521 |
| 5 | 0.6099 | 0.1991 | 0.191 |
| 6 | 0.6117 | 0.1440 | 0.2443 |
| 7 | 0.5964 | 0.098 | 0.3056 |
| 8 | 0.5726 | 0.0621 | 0.3653 |
| 9 | 0.549 | 0.037 | 0.415 |
| 10 | 0.529 | 0.020 | 0.45 |
| 11 | 0.671 | 0.014 | 0.315 |
| 12 | 0.746 | 0.011 | 0.243 |
| 13 | 0.793 | 0.009 | 0.199 |
| 14 | 0.824 | 0.007 | 0.168 |
| 15 | 0.847 | 0.006 | 0.147 |

Table 1 shows how the bandwidth is allocated between the station and the network interface device for different values of c when the first packet transmission method is used.

Clearly, when c=1, the network interface device achieves zero throughput, and the station acquires a large portion of the available bandwidth. As c increases, the fraction of the bandwidth acquired by the station decreases monotonically and quite rapidly. The fraction of bandwidth acquired by the network interface device, on the other hand, increases as c is increased from 0 to 6; then decreases slightly as c is increased from 6 to 10, and increases again with c to attain a maximum at c=15. The overhead portion increases from about 10% when c=2, to about 45% when c=10, and decreases to approximately 15% when c=15. The increase in overhead when c increases from 2 to 10 is due to the exponentially increasing idle time introduced by the backoff algorithm which the station follows; the decrease as c increases from 10 to 15 is explained by the fact that the backoff range stops increasing beyond the 10th collision; this also explains the results concerning the network interface device's bandwidth. The expected cycle length is a measure of the average delay incurred by a packet queued at the station.

The performance of the second packet transmission method according to the invention is now considered. In the second packet transmission method, the idle time introduced by the backoff algorithm following the last collision and preceding the station's transmission is allowed to be captured by the network interface device. The benefit of this method over the preceding method is a consistently lower overhead for all values of c, and therefore a higher aggregate throughput. It should be noted, however, that the station may incur additional collisions beyond c; indeed, it is possible that the point in time selected by the station to transmit its packet coincides with a time at which the network interface device is allowed to transmit a packet (namely, one slot beyond an end-of-carrier). In such a case, the station reschedules its packet for later transmission, and is subject to the same effect repeatedly, albeit with a decreasing probability; consequently, the delay incurred by the station beyond the $c^{th}$ collision is not bounded as in the first station, and there is a non-zero probability that the station times out. It should also be noted, however, that the distribution of the delay incurred by the station has a rather small tail, and the probability that the station times out is extremely small, particularly for small values of c.

The expected cycle length is given by $$E[C] = X(c)(g+T_p) + c(g+T_c+t_{jam}) + Z(c) \quad (7)$$

where Z(c) represents the period of time occupied by the network interface device's additional transmissions, the possible additional collisions, and the station's successful transmission. The additional collisions are numbered consecutively, starting with c+1. Z(c) is given recursively in terms of Z(c+1) as follows. Let $\beta_c$ denote the number of scheduling points which may result in a collision; therefore, $$\beta_c = \left\lceil \frac{2^{\min\{c,10\}} - 1}{\sigma_{max} + 1} \right\rceil \quad (8)$$

Thus the probability that the station incurs at least one additional transmission is given by $\beta_c/2^{\min\{c,10\}}$. By the same token, the number of scheduling points which result in a successful transmission by the station is given by $2^{\min\{c,10\}} - \beta_c$, and the probability of a successful transmission by the station prior to incurring an additional collision is given by $(2^{\min\{c,10\}} - \beta_c)/2^{\min\{c,10\}}$. Similarly, the number of potential transmissions by the network interface device prior to either a collision or the successful transmission by the station is $\beta_c$, and the probability that the network interface device undertakes the $k^{th}$ such transmission, $k=1, 2, \ldots, \beta_c$, is given by $[2^{\min\{c,10\}} - 2 - (k-1)(\sigma_{max}+1)]/2^{\min\{c,10\}}$. Accordingly, Z(c) is given by $$Z(c) = \quad (9)$$

$$\sum_{k=1}^{\beta_c} \frac{2^{\min\{c,10\}} - 2 - (k-1)(\sigma_{max}+1)}{2^{\min\{c,10\}}} (g + s + T_p) +$$

$$\frac{2^{\min\{c,10\}} - \beta_c}{2^{\min\{c,10\}}}(g + T_s) + \frac{\beta_c}{2^{\min\{c,10\}}}[g + s + T_c + Z(c+1)]$$

$$Z(16) = 0$$

The fractions of the total bandwidth which are acquired by the network interface device and station are given by $$E[\text{network interface device}] = \frac{X(c)T_p + Z_1(c)}{E[C]} \quad (10)$$

-continued $$E[\text{station}] = \frac{Z_2(c)}{E[C]} \quad (11)$$

where $$Z_1(c) = \sum_{k=1}^{\beta_c} \frac{2^{\min\{c,10\}} - 2 - (k-1)(\sigma_{max}+1)}{2^{\min\{c,10\}}} T_p +$$

$$\frac{\beta_c}{2^{\min\{c,10\}}} Z_1(c+1) \quad (10)$$

$$Z_2(c) = \frac{2^{\min\{c,10\}} - \beta_c}{2^{\min\{c,10\}}} T_s + \frac{\beta_c}{2^{\min\{c,10\}}} Z_2(c+1) \quad (12)$$

$$Z_1(16) = Z_2(16) = 0$$

The remainder of the bandwidth is occupied by overhead.

Table 2 below shows how the bandwidth of the channel are allocated between network interface device and station for different values of c for the second inventive packet transmission method.

TABLE 2

| c | E[inter.] | E[sta.] | overhead |
|---|-----------|---------|----------|
| 2 | 0.507 | 0.416 | 0.077 |
| 3 | 0.631 | 0.298 | 0.071 |
| 4 | 0.703 | 0.229 | 0.068 |
| 5 | 0.757 | 0.177 | 0.066 |
| 6 | 0.807 | 0.131 | 0.062 |
| 7 | 0.853 | 0.091 | 0.056 |
| 8 | 0.893 | 0.059 | 0.048 |
| 9 | 0.923 | 0.035 | 0.042 |
| 10 | 0.944 | 0.020 | 0.037 |
| 11 | 0.958 | 0.014 | 0.029 |
| 12 | 0.965 | 0.011 | 0.024 |
| 13 | 0.970 | 0.009 | 0.022 |
| 14 | 0.973 | 0.007 | 0.020 |
| 15 | 0.975 | 0.006 | 0.019 |

The numerical results of Table 2 show that as c increases, the network interface device's throughput increases steadily, the station's throughput decreases steadily, and the overhead decreases from a maximum of about 8%.

If the channel between the station and the network interface device has a total bandwidth of 10 Mbit/sec and c is chosen to be equal to three, then a bandwidth of about 6.3 Mb/sec is allocated to the network interface device and a bandwidth of about 3 Mb/sec is allocated to the station when the second packet transmission method is used. The 3 Mb/s bandwidth allocated to the station is sufficient to accommodate two video streams at 1.2 Mb/s each. It is also adequate for the case where a plurality of stations forming an Ethernet segment are connected to the same network interface device.

Finally, the above-described embodiments of the invention are intended to be illustrative only. Numerous alternative embodiments may be devised by those skilled in the art without departing from the scope of the following claims.

We claim:

1. A method for transmitting a plurality of packets, said plurality of packets including packets containing continuous data via a transmission channel from a network interface device to at least one station in a communications network segment comprising the steps of:

at the network interface device, maintaining a variable which stores information relating to the success or failure of transmission of said plurality of packets in said transmission channel, sensing said channel by said network interface device, if said channel is sensed idle, transmitting one of said packets from said network interface device, and if said channel is sensed busy by said network interface device, sensing said channel for an end-of-carrier signal, waiting a period of time equal to an interframe gap g and attempting to transmit said one packet after a delay $\zeta$ selected according to a first basic bandwidth allocation protocol if said variable maintained at said network interface device is less than a certain limit and according to a second basic bandwidth allocation protocol different from said first basic bandwidth allocation protocol if said variable equals or exceeds said certain limit, said first protocol and second protocol assuring a particular fraction of a bandwidth of said transmission channel to said network interface for the transmission of said plurality of packets containing said continuous data to said at least one station while also providing a portion of said bandwidth of said channel to said at least one station for the transmission of packets via said channel to said network interface device.

2. The method of claim 1 wherein one of said first and second protocols is a Greedy protocol according to which $\zeta$ is selected equal to zero.

3. The method of claim 1 wherein one of said first and second protocols is a Deferring protocol according to which $\zeta$ is selected at least equal to $\tau + (2^{\min\{n,10\}} - 1) \cdot s$, where n is the number of collisions thus far incurred by the stations, $\tau$ is the maximum roundtrip propagation delay of the channel, and s is the slot time of said channel.

4. The method of claim 3 wherein $\zeta$ is selected equal to $2^{\min\{n,10\}} \cdot s$.

5. The method of claim 1 wherein one of said first and second protocols is a Courteous protocol according to which $\zeta$ is selected equal to at least $\tau$, where $\tau$ is the maximum roundtrip propagation delay of the channel.

6. The method of claim 5 wherein $\zeta$ is selected equal to s, where s is the slot time of the channel.

7. The method of claim 5 wherein a plurality of stations are connected to the network interface device via the channel and wherein if a collision amongst the stations is detected, $\zeta$ is selected equal to at least $\tau + (2^{\min\{n\}} - 1) \cdot s$, where n is the number of collisions thus far incurred by the stations and s is the slot time of said channel.

8. The method of claim 7 wherein if a collision amongst the stations is detected, $\zeta$ is selected equal to $2^{\min\{n\}} - 1) \cdot s$.

9. The method of claim 1 wherein the variable maintained at the network interface device stores the number of collisions thus far incurred by the stations.

10. The method of claim 9 further comprising the steps of:

if a packet is successfully transmitted from a station, resetting n to zero, and if a collision is incurred by a station, incrementing n by 1, where n is the number of collisions thus far incurred by the stations.

11. The method of claim 1 wherein the variable maintained at the network interface device stores the number of successfully transmitted packets by the stations in each observation window of time.

12. The method of claim 1 wherein the variable maintained at the network interface device stores the number of packets successfully transmitted from the network interface device in each observation window of time.

13. The method of claim 1 wherein the variable maintained at the network interface device stores the ratio of the number of packets successfully transmitted from the network interface device to the number of packets successfully transmitted from the stations in each observation window of time.

14. The method of claim 1 wherein the variable maintained at the network interface device stores the number of collisions thus far incurred by the stations, wherein the first protocol is a Greedy protocol according to which $\zeta$ is selected equal to zero and wherein the second protocol is a Deferring protocol according to which $\zeta$ is selected at least equal to $\tau + (2^{min\{n\ \}} - 1) \cdot s$, where n is the number of collisions thus far incurred by the stations, $\tau$ is the maximum roundtrip propagation delay of the channel, and s is the slot time of said channel.

15. The method of claim 1 wherein the variable maintained at the network interface device stores the number of collisions thus far incurred by the stations, wherein the first protocol is a Greedy protocol according to which $\zeta$ is selected equal to zero and wherein the second protocol is a Courteous protocol according to which $\zeta$ is selected equal to at least $\tau$, where $\tau$ is the maximum roundtrip propagation delay of the channel.

16. The method of claim 1 wherein the variable maintained at the network interface device stores the number of packets successfully transmitted by the stations in each observation window of time, wherein the first protocol is a Courteous protocol according to which $\zeta$ is selected equal to at least $\tau$, where $\tau$ is the maximum roundtrip propagation delay of the channel, and wherein the second protocol is a Greedy protocol according to which $\zeta$ is selected equal to zero.

17. The method of claim 1 wherein the variable maintained at the network interface device stores the number of packets successfully transmitted by the stations in each observation window of time, wherein the first protocol is a Deferring protocol according to which $\zeta$ is selected at least equal to $\tau + (2^{min\{n\ \}} - 1) \cdot s$, where n is the number of collisions thus far incurred by the stations, $\tau$ is the maximum roundtrip propagation delay of the channel, and s is the slot time of said channel, and wherein the second protocol is a Greedy protocol according to which $\zeta$ is selected equal to zero.

18. The method of claim 1 wherein the variable maintained at the network interface device stores the number of packets successfully transmitted by the network interface device in each observation window of time, wherein the first protocol is a Greedy protocol according to which $\zeta$ is selected equal to zero and wherein the second protocol is a Courteous protocol according to which $\zeta$ is selected equal to at least $\tau$, where $\tau$ is the maximum roundtrip propagation delay of the channel.

19. The method of claim 1 wherein the variable maintained at the network interface device stores the number of packets successfully transmitted by the network interface device in each observation window of time, wherein the first protocol is a Greedy protocol according to which $\zeta$ is selected equal to zero, and wherein the second protocol is a Deferring protocol according to which $\zeta$ is selected at least equal to $\tau + (2^{min\{n\ \}} - 1) \cdot s$, where n is the number of collisions thus far incurred by the stations, $\tau$ is the maximum roundtrip propagation delay of the channel, and s is the slot time of said channel.

20. The method of claim 1 wherein the variable maintained at the network interface device stores the ratio of the number of packets successfully transmitted from the network interface device to the number of packets successfully transmitted from the stations in each observation window of time, wherein the first protocol is a Greedy protocol according to which $\zeta$ is selected equal to zero and wherein the second protocol is a Courteous protocol according to which $\zeta$ is selected equal to at least $\tau$, where $\tau$ is the maximum roundtrip propagation delay of the channel.

21. The method of claim 1 wherein said limit varies as a function of time.

22. The method of claim 1 wherein a station sends a packet to the network interface device in accordance with the following steps:
- at the station, initiating the transmission of a packet from the station into the channel,
- sensing the channel at the station to determine if the packet from the station was successfully transmitted to the network interface device or if the packet experienced a collision, and
- if the packet experienced a collision, rescheduling the packet in accordance with an exponential backoff algorithm.

23. The method of claim 1 wherein said transmission channel is formed by a coaxial cable.

24. The method of claim 1 wherein said transmission channel is formed by a twisted pair of wires.

25. The method of claim 1 wherein said channel is wireless.

26. The method of claim 1 wherein at least some of said packets contain video data.

27. The method of claim 1 wherein packets are transmitted from said stations via said channel in accordance with the IEEE 802.3 protocol.

* * * * *